United States Patent [19]

Heshmat

[11] 4,277,113
[45] Jul. 7, 1981

[54] COMPOSITE MATERIAL COMPLIANT BEARING ELEMENT

[75] Inventor: Hooshang Heshmat, Troy, N.Y.

[73] Assignee: Mechanical Technology Incorporated, Latham, N.Y.

[21] Appl. No.: 80,504

[22] Filed: Oct. 1, 1979

[51] Int. Cl.³ ............................................. F16C 32/06
[52] U.S. Cl. ........................................ 308/9; 308/73; 308/160; 308/DIG. 1; 308/DIG. 14
[58] Field of Search ..................... 308/9, 73, 121, 160, 308/168, 241, DIG. 1, DIG. 8, DIG. 14

[56] References Cited

U.S. PATENT DOCUMENTS

| | | | |
|---|---|---|---|
| 3,677,612 | 7/1972 | Barnett et al. | 308/9 |
| 3,747,997 | 7/1973 | Winn | 308/9 |
| 3,806,209 | 4/1974 | Laing et al. | 308/9 |
| 3,809,443 | 5/1974 | Cherubim | 308/9 |
| 3,884,534 | 5/1975 | Winn | 308/9 |
| 4,005,914 | 2/1977 | Newman | 308/9 |
| 4,082,375 | 4/1978 | Fortmann | 308/DIG. 1 |
| 4,133,585 | 1/1979 | Licht | 308/121 |
| 4,178,046 | 12/1979 | Silver et al. | 308/9 |
| 4,223,958 | 9/1980 | Gray | 308/9 |
| 4,227,756 | 10/1980 | Bhushan | 308/241 |

FOREIGN PATENT DOCUMENTS

| | | | |
|---|---|---|---|
| 2249458 | 5/1973 | Fed. Rep. of Germany | 308/DIG. 14 |
| 658325 | 4/1979 | U.S.S.R. | 308/DIG. 8 |

OTHER PUBLICATIONS

Gray, S., Society of Auto. Engineers, "Applying Resilient Foil Air Bearings to Turbomachinery-Techniques and Challanges" 15 pp.

Primary Examiner—Richard R. Stearns
Attorney, Agent, or Firm—Joseph V. Claeys; John M. Neary

[57] ABSTRACT

A compliant fluid film bearing includes a thin, flexible bearing sheet supported on a resilient bump-form support member which is divided into multiple adjacent strips. The bearing sheet and support member are each formed of a composite material made of Inconel X-750 and copper. The Inconel sheet, in annealed condition, is cut and formed in the desired shape and is coated with copper. The sheet is heat treated in an oxygen-free atmosphere to give the Inconel the small grain size for the desired properties of strength and hardness. During the heat treatment, the copper diffuses into the Inconel, producing at the end a composite material of Inconel X-750 having a diffusion of copper into its top portion such that the top surface is about 100% copper, and the copper fraction decreases exponentially with the depth into the Inconel sheet. The bearing elements formed of this composite material provide improved coulomb and viscous damping and improved bearing load capacity and stability at high temperature and speed.

21 Claims, 10 Drawing Figures

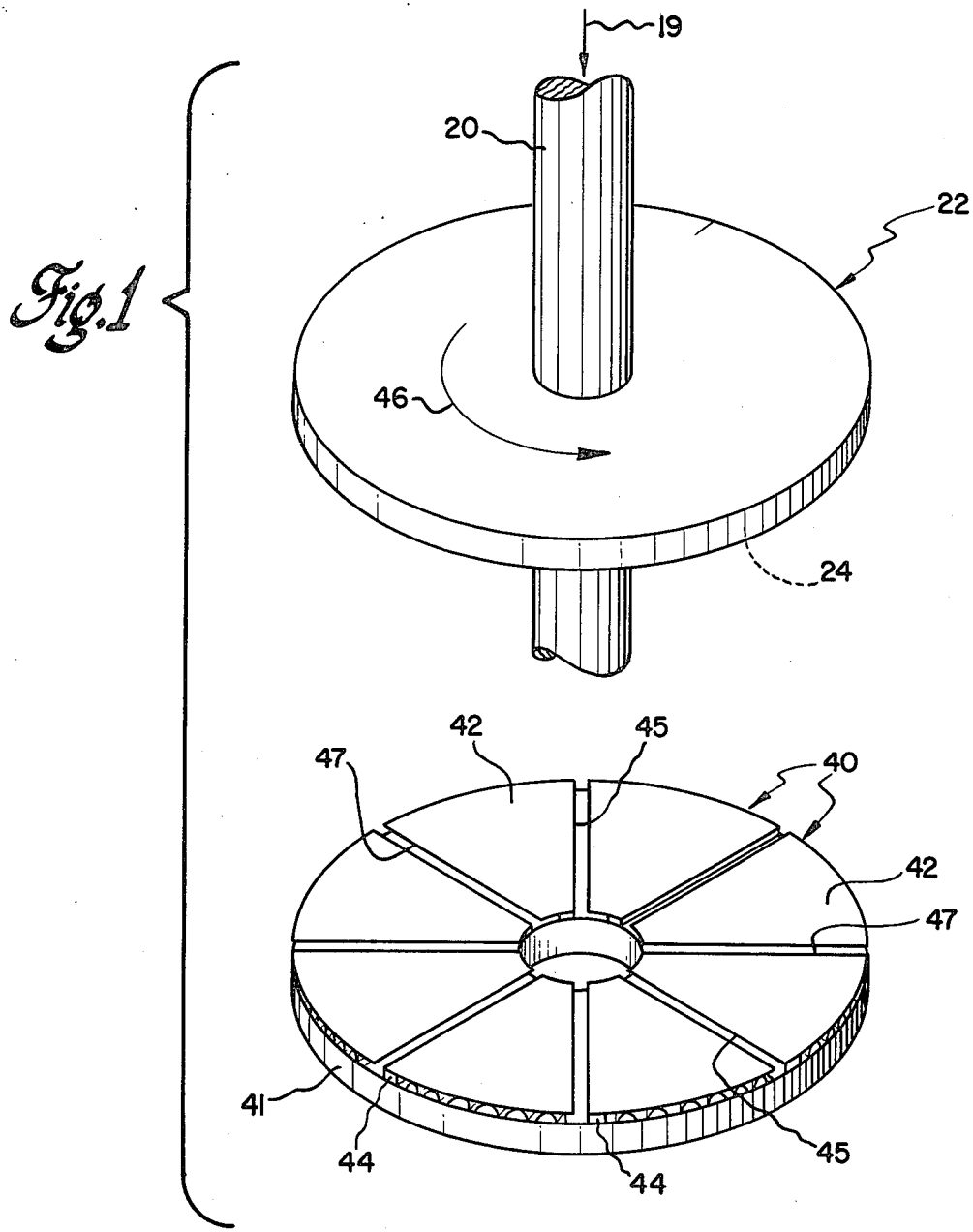
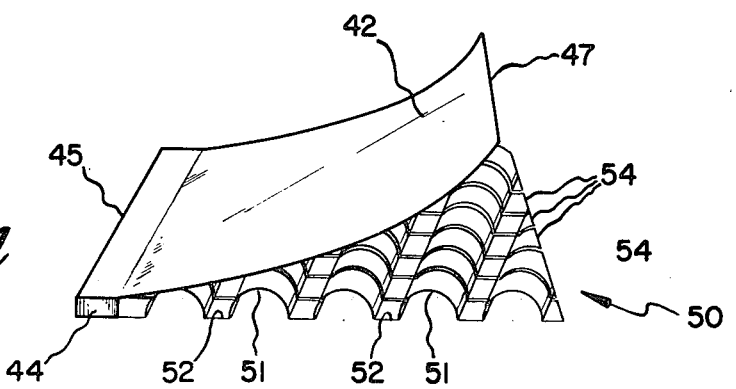

COMPOSITE MATERIAL COMPLIANT BEARING ELEMENT

BACKGROUND OF THE INVENTION

This invention relates to compliant fluid film bearings, and more particularly to composite materials for compliant bearing elements.

A hydrodynamic fluid film bearing is an assembly of thin flexible sheet metal members fastened to a stationary mounting member such as a journal sleeve or a thrust plate. The bearing members include a resilient supporting element attached to the mounting member and a flexible bearing sheet overlying and supported by the supporting element. The bearing sheet is in bearing relationship to the bearing surface of the rotating rotor such as a shaft or a thrust runner. The rotor is supported on a fluid film which is created hydrostatically by injection of an externally pressurized gas or liquid lubricant, or is generated hydrodynamically between the rotor surface and the bearing sheet by relative movement of the rotor bearing surface over the bearing sheet. Although this invention applies to both hydrostatic and hydrodynamic bearings, it will be described, for purposes of brevity and convenience, as a hydrodynamic bearing.

The generation of a hydrodynamic supporting fluid film in the gap between the rotor bearing surface and the bearing sheet is believed to occur because the boundary layer of fluid adjacent to the rotating rotor surface is drawn into the gap, which is slightly wedge-shaped, tapering in the direction of the rotor bearing surface movement. The fluid film in the wedge-shaped gap builds in pressure toward the trailing edge of the gap, thereby providing a thin pressurized supporting cushion or film of fluid between the bearing sheet and the rotor.

Compliant hydrodynamic gas bearings provide an attractive alternative to conventional bearings in that they are capable of good durability in ultra-high speed applications. Moreover, they are capable of operating at extremely high temperatures and in hostile environments which would preclude the use of conventional lubrication.

The development of compliant hydrodynamic gas bearings has reached the point where they are now capable of performing in a reliable and durable manner, provided that they are designed properly for the application for which they are to be used. However, I have developed an improvement that makes it possible substantially to increase the load capacity of the thrust and journal bearing without increasing the diameter, thereby keeping the size and power loss and cost small while increasing the load capacity. Also, my improvement decreases the severity of the effects of the instability phenomenon which compliant gas journal bearings can exhibit. Finally, my improvement will lengthen the fatigue life of the bearing. These improvements should greatly enhance the overall performance of compliant gas bearings.

SUMMARY OF THE INVENTION

Accordingly, it is an object of this invention to provide a compliant gas bearing having improved load carrying capacity, stability, and durability, and to make these improvements in a manner which does not complicate the bearing, make it more expensive, or decrease its reliability.

These and other objects of the invention are achieved in a compliant gas bearing having a compliant support element formed with resilient support elevations supporting a flexible bearing sheet on its top surface. The support element is a composite material made of a high-temperature, high-strength base metal, and a second metal having coefficients of friction and thermal expansion greater than the base metal. The second metal is clad on the surface of the base metal or is diffused into its surface. The rotating rotor is supported on a composite bearing sheet whose surface is clad with, or into which is diffused, a second metal having a higher coefficient of friction and thermal expansion than the base metal of the bearing sheet. The composition and proportion of the second metals are selected to produce thermal growth in the bearing elements which compensate for undesirable thermal and pressure effects occurring in the bearing element in operation, and also to provide viscous and coulomb damping to improve bearing stability. The improved thermal conductivity provided by the diffused second metal enhances the heat transfer characteristics of the bearing elements to dissipate undesirable excessive localized heating.

DESCRIPTION OF THE DRAWINGS

The invention and its many attendant objects and advantages will become better understood upon reading the description of the preferred embodiment in conjunction with an examination of the following drawings, wherein:

FIG. 1 is a perspective view of a thrust bearing made in accordance with this invention;

FIG. 1A is a developed view of one pad of the bearing shown in FIG. 1;

DESCRIPTION OF THE PREFERRED EMBODIMENT

Figure 2:
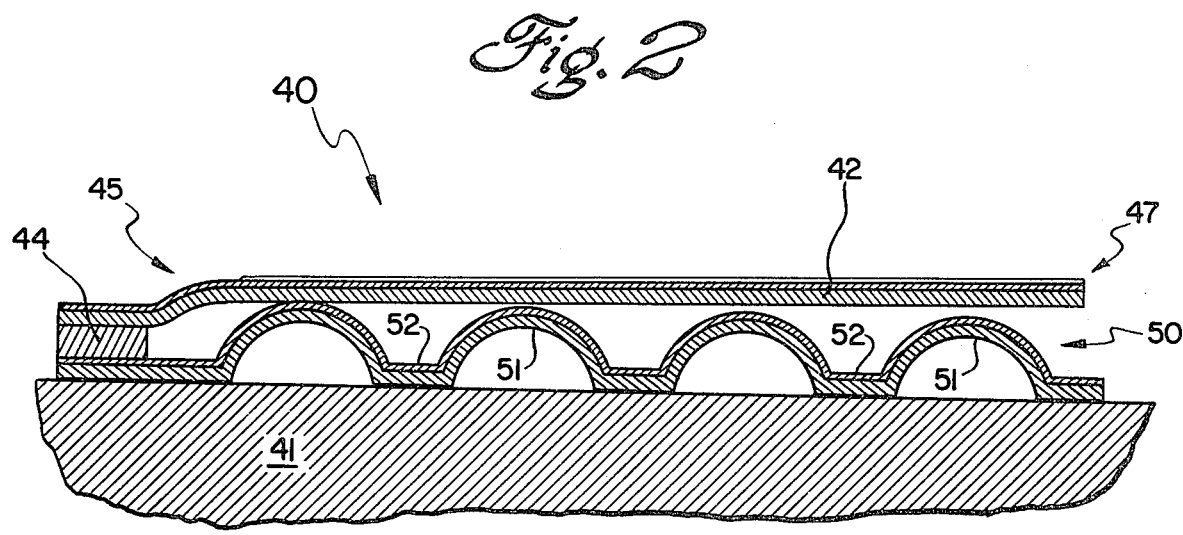
FIG. 2 is a sectional elevation along a chord line looking radially into one of the pads in FIG. 1.

Referring now to the drawings, wherein in like reference characters designate identical or corresponding parts, and more particularly to FIG. 1 thereof, a hydrodynamic fluid thrust bearing is shown for supporting the axial thrust 19 of a rotating shaft 20. A thrust runner 22 having a downwardly facing bearing surface 24 is fastened to the shaft and rotates with it. The axial thrust of the shaft 20 and runner 22 is borne by a plurality of thrust pad assemblies 40 fastened to the top surface of a mounting member, such as the thrust plate 41, fixedly mounted in co-axial relationship to the rotational axis of the rotor. Normally, the thrust plate is fixed to the machine frame, but there are applications wherein it is advantageous for the thrust plate to rotate. The compliant bearing is particularly suited for these applications because of its light weight. Hence both stationary and rotating thrust plates are contemplated for use in this invention, provided that there is relative rotation between the thrust runner and plate.

Each thrust pad assembly 40 is in the form of a truncated sector. Eight pads are illustrated in this embodiment, although fewer or more pads can be used. Each pad includes a bearing sheet 42 welded to the top surface of a spacer block 44 at the leading edge 45 of the bearing sheet 42, in the sense of the direction of rotation of the rotating thrust runner 22, shown by arrow 46, and is free at the trailing edge 47. The spacer block 44 is, in turn, welded along its bottom face to the thrust plate at the leading edge 45 of the pad.

The bearing sheet 42 is supported by an underlying resilient support element 50 formed of a sheet of spring metal with a plurality of resilient support elevations 51 projecting from the plane of the sheet and separated by valleys 52. The resilient support elevations are in the form of ridges or corrugations best shown in the developed view of the pad in FIG. 1A and in FIG. 2, with the axes of the corrugations lying parallel to each other and to the leading edge 45 of the pad 40. The bearing sheet 42 overlies the resilient support element 50 and is compliantly supported thereby to enable the bearing sheet to conform to the plane of the thrust runner and to assume the correct hydrodynamic profile under the influence of hydrodynamic forces generated by the relative movement of the thrust runner 22 over the bearing sheet 42. The compliant support element 50, whose purpose and structure is described in patent application serial number 974,256 filed on Dec. 29, 1978 by Gray and Heshmat, the disclosure of which is incorporated herein by reference, is split into a plurality of strips 54 for improved load capacity and misalignment tolerance, as fully explained in the foresaid patent application. Alternatively, the support element 50 could be of the form and oriented like the support element in my copending application Ser. No. 080,503 filed concurrently herewith, the disclosure of which is incorporated herein by reference.

I have discovered how to increase the load capacity of the thrust and journal bearing without significantly increased cost and without degrading other characteristics of the bearing. Essentially, this is done by forming one or more bearing elements of a composite metal that introduces viscous and coulomb damping to improve stability, and causes differential thermal expansion across the thickness of the bearing members to compensate for thermal and pressure effects which the bearing encounters at operating conditions of speed, pressure, and temperature. Ultimately, the purpose of the damping is to absorb vibration and whirl energies, and the purpose of the differential thermal expansion at different depths of the bearing element is to cause the bearing to maintain its optimum configuration despite changes in temperature and pressure which the bearing encounters over its range of operating conditions, from low load and speed to high load and speed. In the process of making these improvements, I have also made several serendipitous improvements in the life of the bearing and in the reliability of the bearing, all of which will be explained below.

Figure 3:
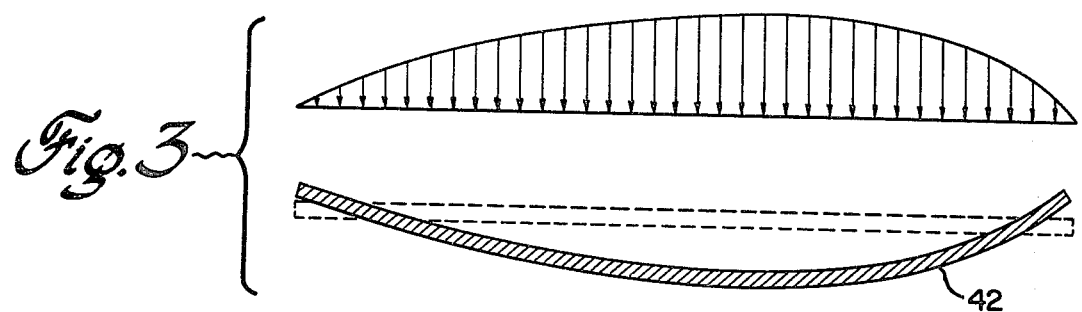
FIG. 3 is a schematic sectional elevation of the bearing sheet of one of the bearing pads shown in FIG. 1 as deflected by a hydrodynamic gas film whose pressure profile is shown over the bearing sheet.

I have hypothesized that a major cause of the thrust bearing load capacity limitation is due to changes in the geometric configuration of the bearing elements under high temperature and pressure. It is known that as the bearing speed and the load on the bearing increase, a pressurized gas cushion is generated between the thrust runner and the bearing sheet. The pressure profile of this gas cushion is shown in FIG. 3. The pressure is greatest in the central area of the bearing sheet and tapers to zero at its edges. According to my hypothesis, the bearing sheet, which is supported on an elastic support, is depressed by the hydrodynamic fluid film downward in a concave hollow in the central portion of the bearing sheet as shown in FIG. 3 and, because of the elastic support, projects upwardly from its original position around the edges of the bearing sheet. This situation gives rise to two possible deleterious affects on the bearing: (1) if the deflection, illustrated in FIG. 3 (grossly exaggerated for purposes of illustration) is much greater than the film thickness, a loss of load carrying capacity in the central portion of the bearing can occur; and, (2) the upward movement of the edge portions of the elastically supported bearing sheet (also illustrated in exaggerated form in FIG. 3) in the areas where the pressure of the supporting hydrodynamic gas cushion is low can cause the bearing sheet to contact the thrust runner and be damaged by it.

To counteract these effects, I form the bearing sheet 42 and the support element 50 of the thrust bearing from a composite material which includes a base portion of a first metal which has high-temperature, high-strength characteristics, and an upper portion of a second metal which has a higher coefficient of friction and thermal expansion than the base metal. The second metal may be bonded to the base metal to produce a discrete two-layer structure, provided the bond can withstand the mechanical and thermal stress to which it will be subjected. However, I prefer to diffuse the second metal, at least partially, into the top or bearing surface of the sheet to produce a bearing sheet having a diffusion of the second metal into the base metal, the concentration of which decreases exponentially with the depth below the bearing surface. This eliminates the possibility of the coating delaminating, and the same frictional and differential thermal expansion effects are obtained, as explained below.

The base metal I prefer is Inconel X-750 which is a nickel based alloy containing chromium, iron, aluminum and titanium. The second metal is copper, selected because of its high coefficients of friction and thermal conductivity, and affinity for nickel. However, I believe silver and aluminum would also work well, for the same reason that copper does.

Figure 4:
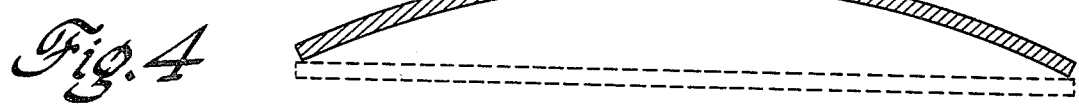
FIG. 4 is a schematic sectional elevation similar to FIG. 3, but with the support element at high temperature and bowed upwardly by the differential thermal expansion of its top and bottom zones.
Figure 5:
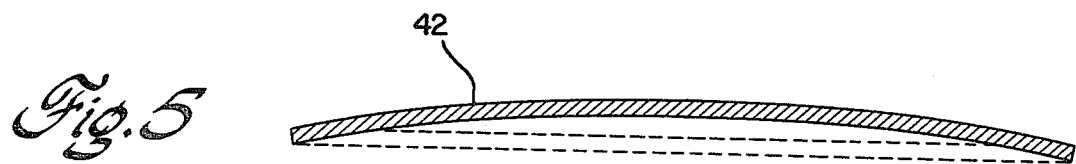
FIG. 5 is a schematic sectional elevation of the bearing sheet shown in FIG. 3, showing in dotted lines its configuration under the influence of heat and hydrodynamic loading.

The proportion of the second metal to the first metal, and its coefficient of thermal expansion relative to that of the first metal, is chosen to cause the sheet to bend, under the influence of the differential coefficients of thermal expansion, to an upwardly convex curve at the operating temperature of the bearing as shown in FIG. 4. The radius of curvature of the convex curve, that is, the extent of the upward deflection of the center of the curve, is chosen to slightly exceed the radius of curvature of the downward deflection of the bearing sheet which would be caused, independently, by the supporting hydrodynamic gas cushion generated over a homogenous bearing sheet at operating speed by the thrust runner as shown in FIG. 3. The final shape resulting from the combined effects of the composite sheet thermally expanding differentially in its top and bottom portions, and the pressurized hydrodynamic gas cushion bearing down against the top surface of the bearing sheet is a slight upwardly convex crown shape, shown in FIG. 5, in which the total upward deflection of the top surface away from the original plane of the bearing sheet when flat is equal to the film thickness of the supporting hydrodynamic gas film which is approximately 0.0002 inches.

In a bearing pad approximately 2 inches across, it is clear that this degree of convexity would be extremely difficult to machine into a hydrodynamic tilt pad, and yet with a suitable selection of materials and thicknesses which are very easily and precisely applied by sputtering equipment or the like, this crown shape which produces an optimum supporting hydrodynamic gas film is produced easily.

Another problem which I have solved by this invention is "hotspots." Transient effects in a compliant bearing can cause the bearing sheet to momentarily contact the rotor in a small area of the sheet. When this occurs, there is a sudden rise of temperature in the localized area of contact which causes the sheet to expand in that area, forming a small dome-shaped elevation in the sheet. This elevation can itself contact the rotor which will burn almost instantaneously completely through the sheet. The resulting excessive local heating can permanently deform the sheet and, of course, the hole burned through it will drastically affect the supporting fluid film.

Another heating problem is the heat that is generated at the rubbing interface between the peaks of the corrugations of the support element 50 and the undersurface of the bearing sheet 42. This rubbing introduces a salutary damping which is desirable and perhaps even essential to the operation of the bearing, but it also results in localized heating of the bearing sheet and support element in the area of rubbing contact. Localized heating can cause the bearing sheet to become distorted in the area of the corrugation peaks which can cause the bearing sheet itself to become somewhat corrugated. These "corrugations" or elevations in the sheet can interfere with the smooth hydrodynamic action of the bearing and, like the dome-shaped elevations of the "hotspots," can exceed the thickness of the lubricating gas film and contact the rotor surface with the same damaging results as mentioned above.

The infusion of the second metal into the base sheet greatly improves the thermal conductivity of the sheet. High-strength, high-temperature alloys like Inconel X-750 are typically good insulators and do not spread the heat generated locally by the effects mentioned above. By improving the thermal conductivity of the top portion of the sheet, I enable the heat resulting from these effects to be conducted away from the small contact area so that heat distortion elevations do not form and the destructive contact with the rotor is prevented.

Yet a third problem which this invention solves is destructive instability and loss of load capacity of the bearing. I have discovered that the use of the bearing materials disclosed herein reduces the rotor orbiting amplitude of rotor vibration at high rotor speeds to such a low magnitude that they are no longer consequential. Before the use of these materials, the orbit amplitude at high rotor speeds reached peaks that required termination of the tests.

The substantial increase in bearing stability and load capacity achieved by this invention is not completely understood, but I believe is at least partially explainable by a damping theory. I offer this theory to help shed light on the invention and as elucidation to those skilled in the art, not as a limitation to the claims not expressly so limited. My hypothesis is that the bearing sheet 42 is subjected to high-frequency impulses as the rotor rotates over it. These impulses are periodic in nature and are probably caused by unevenness in the rotor surface, rotor imbalance, bearing misalignment or the like. When the impulses reach some multiple or fraction of the natural frequency of the bearing sheet, its vibration amplitude increases greatly and can become so great that it exceeds the 100 micron thickness of the fluid film and contacts the rotor. These vibrations are partially damped by the coulomb interface damping between the peaks of the support element corrugations and the undersurface of the bearing sheet. However, this damping does not necessarily have a strong affect on the portions of the bearing sheet suspended like a bowstring between adjacent corrugations. These sections of the bearing sheet can vibrate at their own resonant frequencies, which vastly complicates the analysis of the bearing sheet vibrations.

I believe that the remarkable reduction of orbit amplitudes which this invention has demonstrated occurs because copper in the top portion of the composite sheet has a much lower yield strength than the Inconel X-750, and therefore will yield plastically under bending stresses while the Inconel deforms elastically. The plastic yielding of the copper portion of the composite sheet does not produce a permanent deformation of the sheet as a whole because the elastic limit of the Inconel is not exceeded. Therefore, the sheet resumes its original shape after the bending impulse, and in the process redeforms the copper portions back to their original configuration. This process involves substantial viscous damping wherever bending occurs, and to a degree proportional to the degree of bending, which converts the otherwise destructive whirl and vibration energies to heat. This heat is spread rapidly over a large surface area of the bearing sheet 42 and the support element 50 by the copper moiety of the composite sheet and is then carried away by the cooling and lubricating gas.

Another benefit of forming the bearing sheet of a composite sheet having a top portion of copper is that it becomes easier to apply a dry lubricant film to the bearing sheet. In order to obtain a secure adherence of the dry lubricant coating on a flexible substrate, it is necessary that the substrate be properly cleaned and roughened. The cleaning process can result in a shortening of the fatigue life of a flexible substrate and hence a possible shortening of its life when operating at the upper limit of its operating load range. By providing a copper top zone to the composite bearing sheet, the top surface can be cleaned and roughened without affecting the strength of the Inconel, and the dry lubricant film can be applied to the top surface with a secure bond without lessening the fatigue life of the bearing sheet. Moreover, the dry lubricant film will itself have a longer life and will not produce dust particles of the dry lubricant material when applied to a bearing sheet whose vibrations are damped continuously across the entire surface of the sheet.

The resilient support element 50 is also made of the composite material. An annealed Inconel X-750 sheet about 0.003 inches is slit and formed in a die to the shape illustrated in FIGS. 1 and 2. The slit and formed element is coated with a layer of pure copper to a depth of about 0.0001 to 0.00015 inches and is then heat treated at 1300° F. for 20 hours in flat form if it is to be used in a thrust bearing, or is wrapped around a mandrel if it is to be used in a journal bearing. This gives the Inconel X-750 great strength at high temperature and also diffuses the copper into the top portion of the sheet. The concentration of copper is about 100% at the top surface and decreases exponentially with the depth into the sheet.

Figure 6:
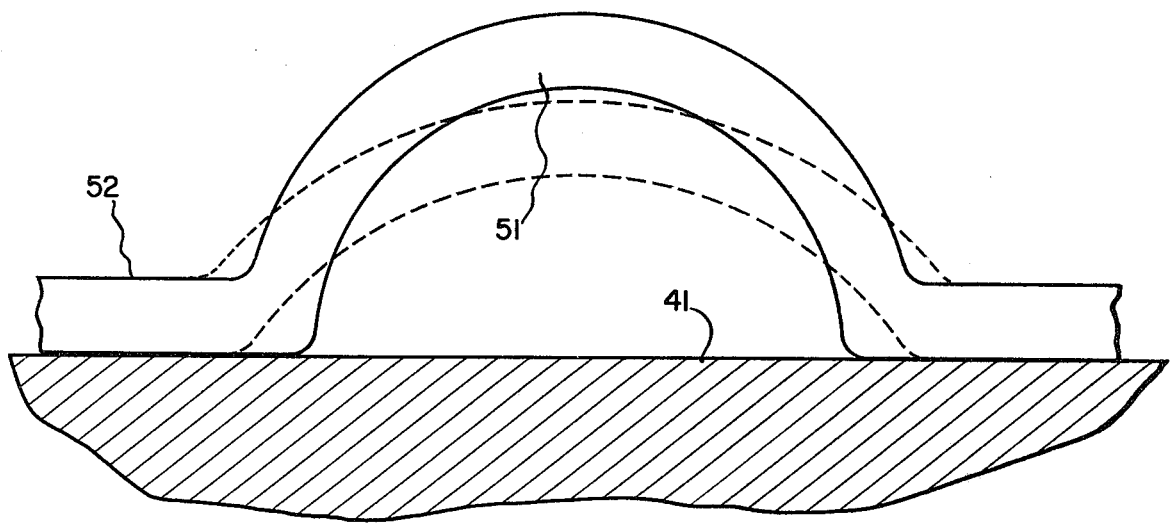
FIG. 6 is a sectional elevation of one bump of a prior art support element of the same geometrical configuration shown in FIG. 2 and, in dotted lines, the shape that the bump would assume under the influence of heat and hydrodynamic pressure.

One purpose of forming the support element 50 of the composite material is to compensate for a loss of stiffness which can occur in the support element at high temperature. The original bump configuration shown in solid lines in FIG. 6, when formed of the base material only, begins to change its spring characteristic at high temperature. As a consequence, the bump under load at high temperature begins to spread and flatten as shown in the dashed lines in FIG. 6. The cause of this effect is primarily in the change of Young's modulus of elasticity of the material at high temperature. The spring constant of the bump is a function of the modulus of elasticity and also the geometrical configuration of the bump. As the temperature increases and the modulus of elasticity of the material decreases the bump begins to flatten as shown which further decreases the spring constant of the bump. The effect then is in a spiralling or avalanche decline of bump stiffness wherein the increasing temperature lessens the modulus of elasticity of the material which becomes less able to withstand the stress and therefore deforms to a geometrical shape which itself gives a smaller spring constant. The compliant support element in this condition is not only softer but has a smaller degree of deflection which it can accommodate in conditions of misalignment before exceeding the elastic limit of the material. In addition, the flattened bump decreases the bearing preload and increases the bearing clearance which permits a greater bearing orbit amplitude and increases the periodic forces on the bearing. Finally, the temperature of the support element is often not uniform because the highest temperature occurs at the area of greatest load, that is toward the central portion of the support element. Thus, the flattening of the support elevations under temperature and load in the central area of the bearing is liable to exaggerate the central depression of the bearing sheet shown in FIG. 3 and also exaggerate the upward deflection of the peripheral edges of the bearing sheet thereby increasing the likelihood of the bearing sheet touching the thrust runner and its consequent damage. It is therefore clear that it is very advantageous for the elevations of the compliant support element to retain their geometric configuration throughout the operating temperature range of the bearing.

Figure 7:
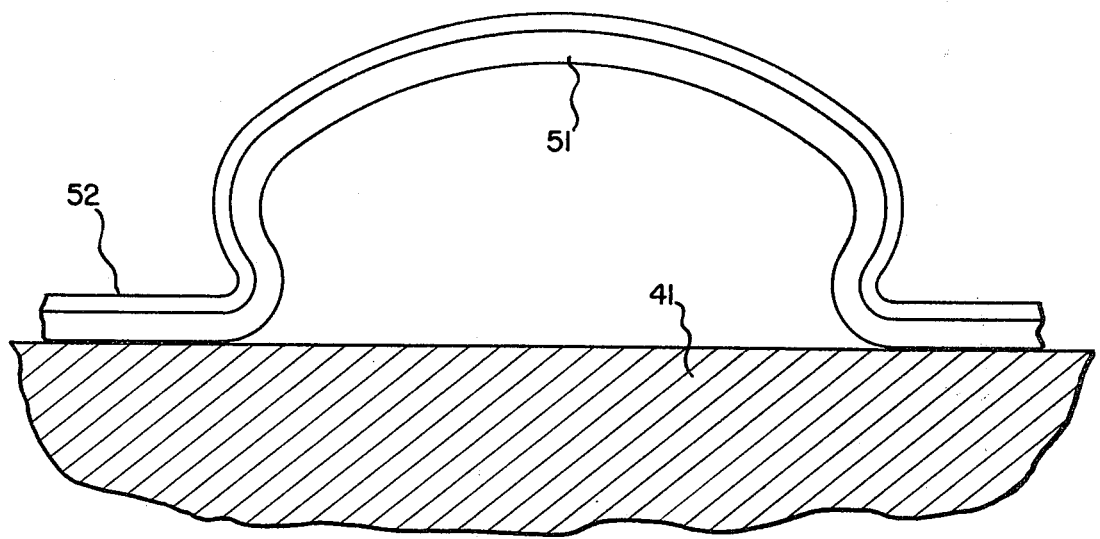
FIG. 7 shows one bump of the inventive support element under the influence of heat only.

In accordance with the invention, the resilient support element 50 is formed of the composite material in the manner explained above. A single bump 51 of the support element in its unloaded and cool condition is shown in the solid lines of FIG. 6. As the load increases, the temperature increases and the second metal portion of the composite material expands more than the base metal. This condition tends to cause the bump to assume the open elliptical shape or capital omega shape illustrated in FIG. 7. The bump actually does not assume this shape because the increasing load tends to make the bump assume the flattened configuration shown in dotted lines in FIG. 6. Therefore the resulting shape under temperature and load is desired bump shape shown in solid lines in FIG. 6 so the stiffness of the support element 50 and the bearing clearance remain constant over the full range of operating conditions of the bearing.

Another advantage of using the composite material to form the resilient support element 50 is enhanced damping. The material damps vibrations transmitted to the support element in the same manner described for the bearing sheet 42 above. In addition, the resilient elevations coact with the underside of the beaing sheet to produce an enhanced degree of coulomb damping which cooperates with the viscous damping of the support element and bearing sheet to stabilize the bearing against all forms of instability phenomenon. This coulomb damping occurs in the presence of relative movement between the bearing sheet 42 and the elevations 51 of the support element 50. This relative movement is the result of the elevations 51 of the support element 50 flattening and recovering slightly in operation which causes the entire support element to expand and contract, respectively, away from and toward the fixed end at the spacer block.

The coefficient of friction between copper and Inconel is more than double that of Inconel and Inconel. Therefore, the copper top surface of the support element 50 in contact with the Inconel bottom surface of the bearing sheet 42 gives more than twice the coulomb damping that plain Inconel elements gave. The bottom surface of the bearing sheet 42 could be given a flash of copper to improve the coulomb damping without affecting the differential thermal expansion effect mentioned above, although I have not found this to be necessary. The coulomb and viscous damping and the uniform bearing clearance and stiffness provided by this invention have been sufficient to greatly improve the load bearing capacity and stability of the bearing.

Figure 8:
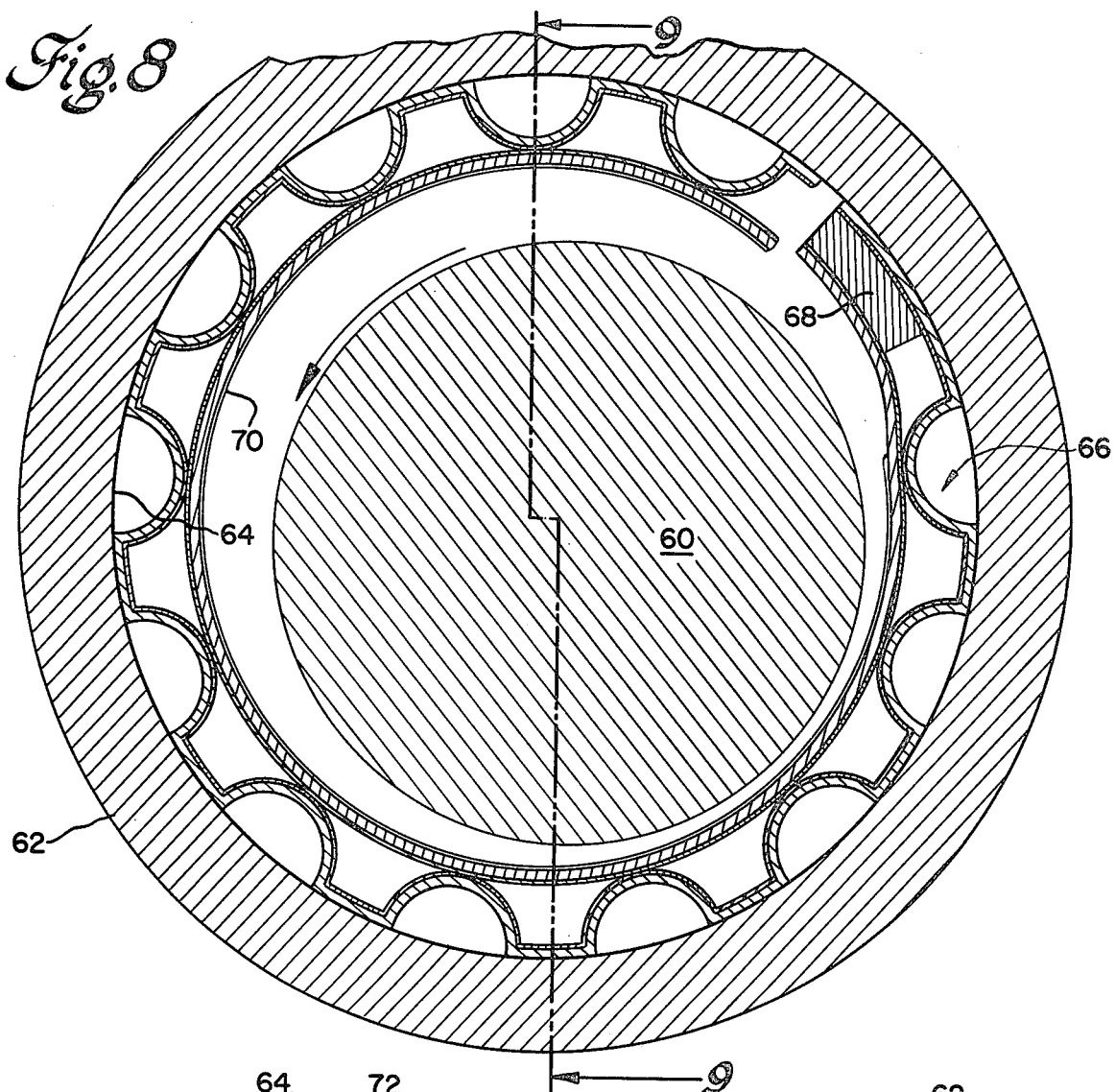
FIG. 8 is an axial elevation of a journal bearing made according to this invention.
Figure 9:
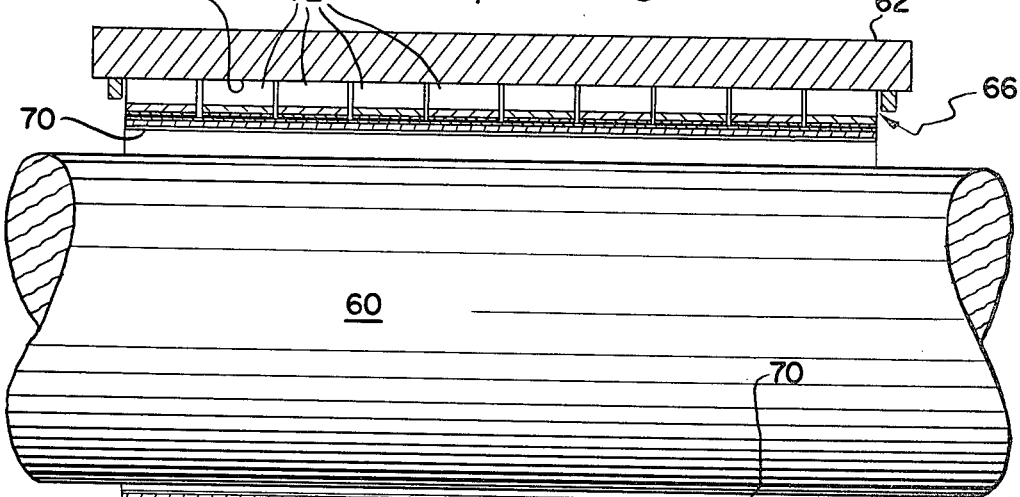
FIG. 9 is a sectional elevation along lines 9—9 in FIG. 8.

Referring now to FIGS. 8 and 9, a journal bearing made according to this invention is shown dynamically supporting a rotating shaft 60. The bearing includes a stationary mounting member such as the journal sleeve 62 fixedly mounted in co-axial relationship to the rotational axis of the shaft 60 and having a radially inwardly facing surface 64 facing the bearing surface of the shaft and defining an axial bore. A sheet metal resilient support element 66 is mounted in the bore bearing against and supported by the radially facing wall of the bore. A spacer block 68 is fixed at one end of the compliant support element and to the bore at that point. A flexible sheet metal bearing sheet is fixed to the top of the spacer block and lies over the compliant support element resting on and supported by resilient elevations of the compliant support element.

As shown in FIG. 9, the compliant support element is divided into a plurality of separate axially adjacent circumferentially extending strips 72 whose structure and purpose is disclosed in co-pending Application Ser. No. 974,263 filed on Dec. 29, 1978 by Gray et. al., the disclosure of which is hereby incorporated by reference.

The bearing sheet 70 is a composite material like the bearing sheet 42 of the thrust bearing shown in FIGS. 1–7. The copper surface faces the journal sleeve 62. The use of the composite material in the bearing sheet 70 and support element 66 provides the same temperature compensation that it provides for the thrust bearing. In particular, a compliant bearing support element encounters increasing temperature as the speed and load increase because of viscous shear in the lubricating hydrodynamic gas cushion in the bearing interface. As the temperature and pressure rise, the prior art compliant support element, as was the case with the thrust bearing, tends to lose a portion of its stiffness because of a decrease in its modulus of elasticity with increasing temperature. In addition, the greater pressure, which is distributed axially over the bearing sheet 70, is highest in the central portion of the bearing which coincides with the zone of greatest temperature, thereby tending to depress the bearing sheet away from the bearing surface of the rotating shaft and into the compliant support element. This effect is acceptable and even desirable up to a point, however, when the deflection exceeds the thickness of the fluid film there is a loss of load carrying capacity and an enlargement of the bearing clearance between the bearing sheet and the rotating shaft.

Another important influence on the journal bearing stability is damping. Damping is a means for absorbing the energy contained in fluid phenomena associated with the unstable operation. By selectively absorbing this energy, the bearing eliminates the severity of the effects of unstable operation while imposing no significant power losses of its own. Coulomb damping is accomplished, as in the thrust bearing, by frictional engagement between the undersurface of the bearing sheet and the crest of the elevations of the support element. Relative movement between these two members is accomplished when the rotating shaft executes minute orbital vibrations causing corresponding fluctuations in the supporting fluid film between the shaft and the bearing sheet. These pressure fluctuations cause minute deflections of the bearing sheet and corresponding flexing of the support element. The resulting relative movement between the crests of the support element and the underside of the bearing sheet in contact with each other produce the desired damping effect.

The viscous damping is also believed to occur in the same manner as in the thrust bearing. The flexing of the support element and the bearing sheet during operation stresses the copper in the top zone of composite sheet beyond its elastic limit and causes plastic deformation, both in compression and in tension, which absorbs the energy that causes the flexing and is related to instability phenomena.

The bearings described above thus achieve greater load carrying capacity at high speed and high temperature by the use of bearing elements formed of a composite material that gives the bearing a uniform stiffness and clearance over its full operating range. It introduces an optimum degree of damping in two different forms for stability and causes the bearing sheet to assume a geometric shape that is conducive to the generation of large-area, high-pressure supporting hydrodynamic fluid films.

Obivously, numerous modifications and variations of the disclosed embodiments are possible in view of this description. Therefore, it is to be understood that these modifications and variations, and equivalents thereof, may be practiced while remaining within the spirit and scope of the invention which is defined in the following claims, wherein;

I claim:

1. A compliant fluid film bearing for dynamically supporting a rotating rotor, comprising:
   a mounting member mounted in coaxial relationship to the rotational axis of said rotor and having a surface facing a bearing surface of said rotor;
   a compliant support element fastened to said surface of said mounting member, said compliant support element including a metal support sheet having a plurality of resilient support elevations projecting therefrom;
   a bearing sheet lying between said support element and the bearing surface of said rotor;
   said support element formed of a composite material having a first layer of metal in engagement with said mounting member, and an overlying layer of metal in engagement with said bearing sheet and bonded to said first layer, said overlying layer having a coefficient of thermal expansion greater than the coefficient of thermal expansion of said first layer;
   whereby a decrease in the stiffness of the material of the support element with increasing temperature is compensated for by an increase in stiffness of said elevations by virtue of the difference in coefficients of thermal expansion of the materials of the first and overlying layers.

2. The bearing defined in claim 1, wherein said elevations of said support element are in the shape of spaced, rounded ridges at room temperature, said ridges at elevated temperatures each tending to assume the shape of a partially closed ellipse having its long axis parallel to the plane of said support sheet;
   whereby the tendancy for said ridges to flatten under load with increased temperature is compensated for by the tendency for the ridges to assume an omega shape with increased temperature, so the ridge height remains substantially constant over the operating temperature range, resulting in a substantially constant bearing clearance.

3. The bearing defined in claim 1, wherein said overlying layer has a coefficient of friction greater than the coefficient of friction of the material of said first layer, whereby the damping caused by minute relative movement of said bearing sheet and said support element as they flex in operation is enhanced.

4. The bearing defined in claim 1, wherein said bearing sheet is formed of a composite material including a base layer of metal adjacent said support element, and a cladding layer of metal lying over said base layer and adjacent said rotor bearing surface, the coefficient of thermal expansion of said cladding layer of metal being greater than the coefficient of thermal expansion of said base layer of metal.

5. The bearing defined in claim 4, wherein:
   said bearing is a hydrodynamic thrust bearing, said rotor bearing surface is on a rotating thrust runner, and said stationary mounting member is a thrust plate;
   said bearing sheet is fastened at the leading edge thereof to said thrust plate, in the sense of the direction of rotation of said thrust runner, and forms an angle with said runner that is conducive to the generation of a hydrodynamic supporting fluid film between said runner and said bearing sheet;
   said hydrodynamic supporting fluid film has a pressure profile that tends to depress a central zone of said bearing sheet;

said cladding layer, under increased temperatures generated at higher loads, tends to assume an upwardly convexed shape;

whereby the resultant shape of said bearing sheet under the influence of said hydrodynamic supporting fluid film and said differential coefficients of thermal expansion of said bearing sheet layers is an upwardly convex crown shape highly conducive to the generation of high load capacity supporting fluid films.

6. The bearing defined in claim 5, further comprising a top coating of dry lubricant material and a bottom layer of high-friction material to lessen the friction between the bearing sheet and the thrust runner, and to increase the friction between the bearing sheet and the support element for damping purposes and said bearing sheet base layer is protected from oxidation and corrosion by said cladding and bottom layers, and any surface treatment used to enhance the bonding of said dry lubricant material can be made on said cladding layer without weakening said base layer.

7. The bearing defined in claim 4, wherein said bearing is a journal bearing, said rotor bearing surface is on a peripheral, radially facing surface of a rotating shaft, and said stationary mounting member is a journal sleeve;

said bearing sheet is fastened at the trailing edge thereof, in the sense of the direction of rotation of said shaft, and forms a converging wedge with said shaft surface that is conducive to the generation of a hydrodynamic supporting fluid film between said shaft surface and said bearing sheet in the zone of convergance of said wedge;

whereby said bearing sheet, in its normally unstressed zone diametrically opposite the center of the area of said hydrodynamic supporting fluid film, is stressed radially outward by the differential coefficients of thermal expansion of said bearing sheet layers so that the bearing clearance is maintained substantially constant despite changes in temperature.

8. The bearing defined in claim 4, wherein:

said bearing is a journal bearing, said rotor bearing surface is on a peripheral, radially facing surface of a rotating shaft, and said stationary mounting member is a journal sleeve;

said bearing sheet is fastened at the trailing edge thereof, in the sense of the direction of rotation of said shaft, and forms a curved converging wedge with said shaft bearing surface that is convex toward the bearing surface of said shaft surface in the unrolled or planar sense of said shaft surface;

said cladding layer tending to cause said bearing sheet, under the influence of the differential coefficients of thermal expansion of said layers, to assume curved configuration, bending away from the axis of said shaft at the axial ends of said bearing, and lumped inwardly in a slightly hourglass chape in the axial central portion of said bearing;

said bearing generating a hydrodynamic fluid film, in the gap between said bearing sheet and said shaft bearing surface, having a pressure distribution with the greatest pressure normally in the axial central portion of said bearing;

whereby the resultant shape of said bearing sheet under the influence of said hydrodynamic fluid film and said differential coefficients of thermal expansion is a crown shape with respect to said shaft bearing surface, said crown shape being highly conducive to the generation of high load capacity supporting hydrodynamic fluid films.

9. A compliant hydrodynamic fluid film bearing for dynamically supporting a rotating rotor, comprising:

a flexible bearing sheet lying in bearing relationship to said rotor, said sheet having a front bearing surface facing a bearing surface on said rotor, and having a back surface on the side of said bearing sheet opposite said front bearing surface.

a stationary mounting member positioned adjacent and coaxially to the axis of said rotor for operatively supporting said rotor;

a compliant support element attached to said stationary mounting member and resiliently supporting said bearing sheet;

said flexible bearing sheet being formed of a composite material, having a base layer of strong springy metal, and a cladding layer of metal having a coefficient of thermal expansion greater than that of said base layer metal, said cladding layer being on the side of said base layer which is proximate said front bearing surface;

said cladding layer having a thickness and coefficient of thermal expansion with respect to said base layer that it causes said bearing sheet to assume a humped shape, convex toward said rotor bearing surface;

whereby said rotor, when rotating over said bearing sheet at operating speed, generates heat and a hydrodynamic supporting fluid film over said bearing sheet, said heat causing said bearing sheet to expand toward its humped shape, and said hydrodynamic fluid film depressing said bearing sheet toward a concave shape with respect to said rotor bearing surface, such that the resultant shape of said bearing sheet is a crown shape which is convex with respect to said rotor bearing surface.

10. The bearing defined in claim 9, wherein:

said bearing is a journal bearing, said stationary mounting member is a journal sleeve, surrounding said rotor, said rotor is a shaft and said rotor bearing surface is a radially facing peripheral surface of said shaft;

said bearing having a clearance between said shaft and said bearing sheet that is a certain value when cold;

said shaft, when at operating speed and temperature, having diameter greater than its diameter when cold, because of centrifugal and thermal effects;

said bearing sheet, under the influence of said differential coefficients of thermal expansion of said bearing sheet layers, tending to uncurl and bear outwardly against said support element to maintain said bearing clearance substantially constant over the full temperature range of said bearing.

11. A compliant fluid film bearing for dynamically supporting a rotating rotor on a mounting member, including a bearing pad in bearing relationship to a bearing surface of said rotor, said bearing being formed of a resilient support element and a flexible bearing sheet, each having a top surface, said resilient support element having resilient elevations and a bottom surface engaging said mounting member, and said flexible bearing sheet being supported on said resilient elevations of said support element; wherein the improvement comprises:

at least one of said bearing sheet and support element being formed of a composite material sheet including a first metal and a second metal diffused into said first metal and distributed therein in a concentration decreasing exponentially with the depth below said top surface thereof;

said second metal having a yield strength less than said first metal, whereby the damping and high temperature load bearing capacity of said bearing is enhanced.

12. The bearing defined in claim 11, wherein the stress distribution in said composite material sheet across a cross section from top to bottom surface when said one element is deformed by a force normal to said surfaces, is nonlinear.

13. The bearing defined in claim 12, wherein said nonlinear stress distribution is characterized by plastic deformation of portions of said second metal diffused within said first metal.

14. The bearing defined in claim 11, wherein said damping is contributed to by viscous damping of said second metal, strained beyond its elastic limit.

15. The bearing defined in claim 11, wherein said second metal has a coefficient of thermal expansion greater than that of said first metal.

16. The bearing defined in claim 11, wherein said resilient support element is formed of said composite material and is in the form of a corrugated sheet slit into a multiplicity of strips running perpendicular to the axis of said corrugations.

17. A compliant fluid film bearing for dynamically supporting a rotating rotor on a mounting member, comprising:

a flexible bearing sheet having a bearing surface facing and supporting said rotor;

a resilient compliant support element between said bearing sheet and said mounting member for compliantly supporting said bearing sheet;

said flexible bearing sheet being formed of a composite material including a base sheet of strong springy metal and a second metal diffused into said first metal and distributed therein in a concentration decreasing exponentially with the depth below one surface of said base sheet, said second metal having a yield strength less than the yield strength of said strong springy metal, whereby the damping and high temperature load bearing capacity of said bearing is enhanced.

18. The bearing defined in claim 17, wherein said bearing is a thrust bearing and said one surface of said base sheet is said bearing surface.

19. The bearing defined in claim 17, wherein said bearing is a journal bearing and said one surface is on the reverse side of said base sheet from said bearing surface.

20. The bearing defined in claim 17, wherein said support element is formed of said composite material, said element being oriented with said one surface facing said bearing sheet.

21. The bearing defined in claim 20, wherein said support element is formed in a plurality of resilient elevations which engage said bearing sheet, said elevations changing their unloaded shape with increasing temperature to provide an increasing load carrying capacity to compensate for a decreasing load carrying capacity of said support element as a consequence of decreasing modulus of elasticity.

* * * * *